Feb. 28, 1950 — R. L. WILCOX — 2,499,341
MOVABLE WORK STOP FOR SOLID DIE HEADERS
Filed Aug. 3, 1944 — 2 Sheets-Sheet 1

Inventor
Richard Lester Wilcox
By Rockwell Bartholow
Attorneys

Feb. 28, 1950 — R. L. WILCOX — 2,499,341
MOVABLE WORK STOP FOR SOLID DIE HEADERS
Filed Aug. 3, 1944 — 2 Sheets-Sheet 2
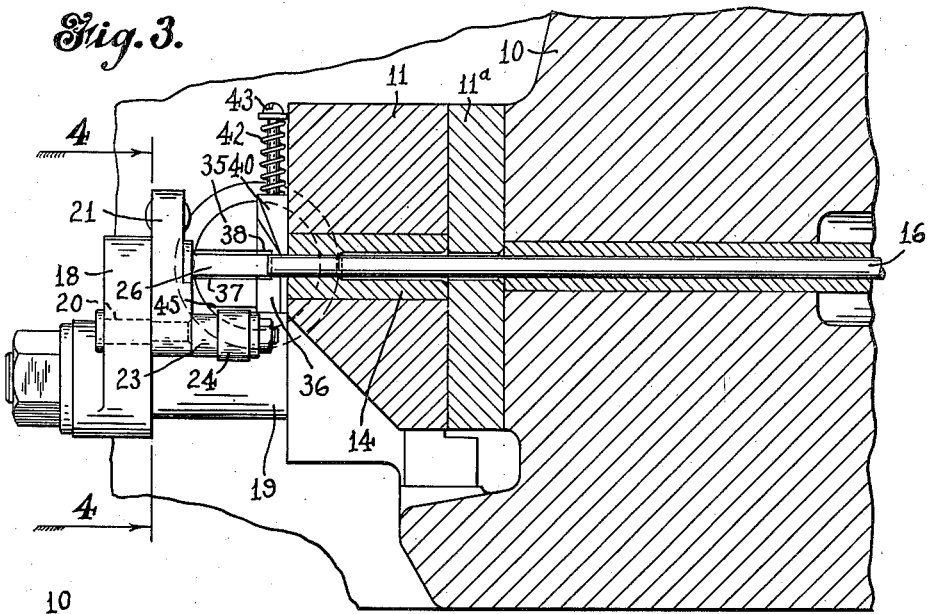
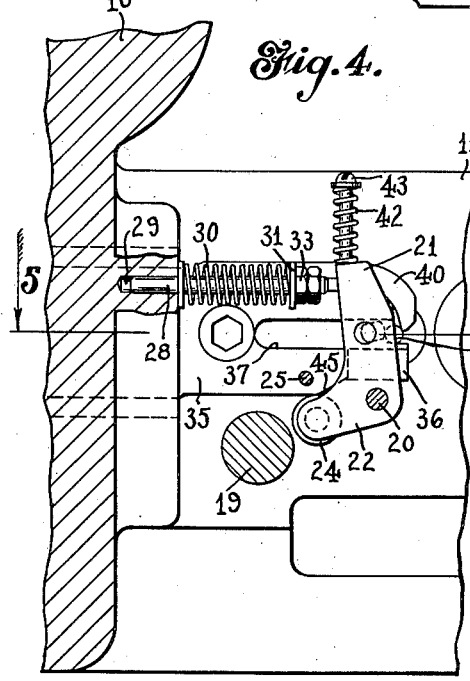
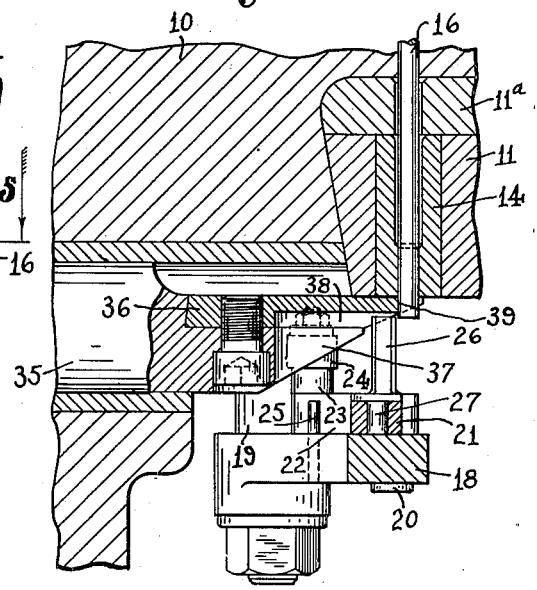
Inventor
Richard Lester Wilcox
By Rockwell & Bartholow
Attorneys Patented Feb. 28, 1950

2,499,341

UNITED STATES PATENT OFFICE 2,499,341

MOVABLE WORK STOP FOR SOLID DIE HEADERS

Richard Lester Wilcox, Waterbury, Conn., assignor to The Waterbury Farrel Foundry & Machine Company, Waterbury, Conn., a corporation of Connecticut Application August 3, 1944, Serial No. 547,913

7 Claims. (Cl. 10—25)

This invention relates to a movable work stop for machines such as headers, for example, wherein a workpiece such as a wire or rod is fed through a die and a predetermined length cut or sheared from the end of the workpiece which protrudes through the die, the sheared portion being used as a blank upon which further operations are performed.

In machines of this character and more particularly in solid die headers where a cut-off or shearing tool is advanced across the front face of the die to sever the protruding end workpiece, the severing tool does not cut the wire or rod in a plane exactly transverse to its axis. In practice, the end faces of the sheared lengths will not be truly perpendicular to the axis of the workpiece but will be at a slight angle thereto. It is desirable to have a square end on the sheared lengths and also to have a smooth end surface to the work blank, and it is contemplated in the present invention to so arrange the cut-off mechanism and associated parts that the work blank which is sheared from the wire or rod, will have a smooth end surface which will also be a "square" end or at right angles to the axis of the blank.

I have found that in cutting off aluminum and other materials, such a result may be satisfactorily obtained by feeding the workpiece against a suitable feed stop whereby the length of the work blank is determined and then removing this feed stop from engagement with the workpiece prior to the shearing operation. In the past, feed stops have been employed to determine the length of the blank, but while these feed stops have been adjustable in order to vary the length of the blank, they have been fixed so far as removal from engagement with the work is concerned, particularly in the case of solid die headers.

One object of the present invention is to provide means for cutting or shearing a blank from a workpiece whereby the blank, as sheared, will have substantially smooth and square ends.

Another object of the invention is to provide in a solid die header a feed stop against which the workpiece is fed to determine the length of the blank, which feed stop is movable to a position out of engagement with the work so that the end of the latter does not engage the stop during the shearing or cutting operation.

A still further object of the invention is to provide a movable feed stop for solid die headers or similar devices, which feed stop will be automatically moved out of engagement with the work when the shearing tool is advanced to shear a blank from the end of the work which protrudes from the die.

A still further object of the invention is to provide a movable feed stop for solid die headers or the like as above described, which feed stop is moved to a position to disengage the work by the action of the advancing shearing mechanism so that the feed stop will be removed from engagement with the work just prior to the beginning of the shearing operation.

In the accompanying drawings:

Fig. 3 is a sectional view on line 3—3 of Fig. 2;

Fig. 4 is a sectional view on line 4—4 of Fig. 3, but showing the work stop and associated parts in another position; and Fig. 5 is a sectional view on line 5—5 of Fig. 4.

Figure 1:
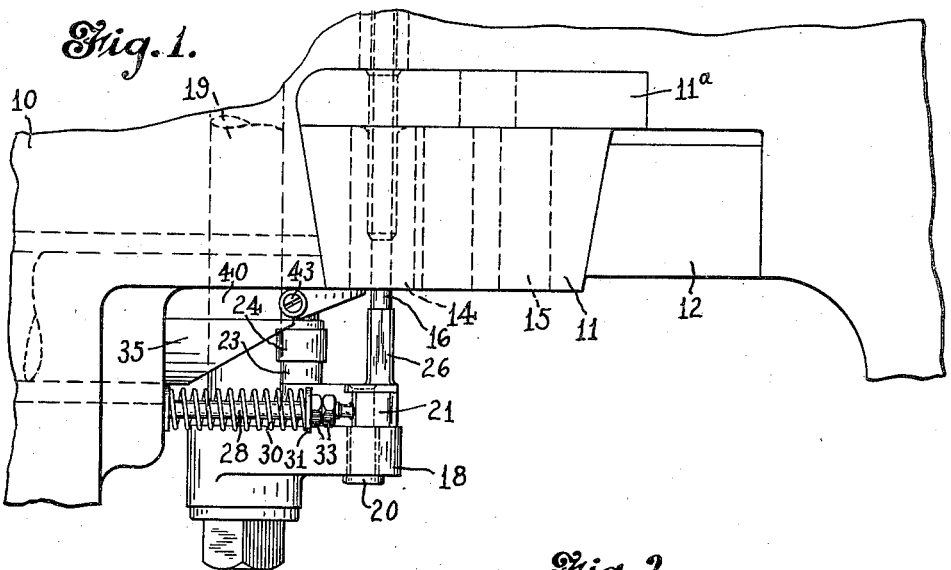
Fig. 1 is a top plan view of a portion of a solid die header embodying my improvements.

To illustrate a preferred embodiment of my invention, I have shown a portion of a solid die header comprising a header frame 10 in which is mounted a die block 11, the block being held in place against a backing plate 11ª by the gib 12, which is in turn secured to the frame by the bolt 13.

The die block 11 carries a cut-off die 14 and a heading die 15 and, as usual in the operation of these machines, a workpiece comprising a length of stock 16 is fed through the cut-off die by appropriate mechanism in a step-by-step manner so that a length of the stock will project from the face of the die. This projecting length of the stock is then sheared off by suitable mechanism as will be described more particularly hereinafter, and in the operation of the machine, the cut-off portion or work blank is advanced to the heading die for a further operation. The workpiece is usually advanced against a stop which may be adjusted to and from the face of the die for engagement by the end face of the workpiece to determine the length thereof which will protrude from the die and, therefore, the length which will be sheared off to become the work blank.

As shown herein, an arm 18 is secured forwardly of the frame of the header, the arm being mounted upon an adjustable rod 19 held in the header frame so that it may be adjusted toward and from the face of the die. A finger of L-shaped form is pivotally secured at 20 to the arm 18 so that the finger may rock about this pivot. The finger comprises a portion 21 projecting upwardly from the pivot 20 across the path of the workpiece and a portion 22 substantially at right angles to the portion 21 which extends laterally from the pivot 20 and is provided adjacent its end with a stud 23 carrying the roller 24. A stop pin 25 is secured in the arm 18 and, as shown in Fig. 5, projects toward the die over the portion 22 of the finger so as to limit the swinging of the finger in a clockwise direction.

Secured to the portion 21 of the finger intermediate its ends is a work stop member 26 designed, when the finger is in its normal position, to stand in the path of the workpiece 16 when the end thereof projects from the face of the die. This stop member may be provided with a stud 27 driven into the finger 21 to secure the stop thereto. From the foregoing, it will be obvious that, as the finger comprising the parts 21 and 22 swings about its pivot 20, the stop member 26 may be moved into and out of engagement with the end of the workpiece.

The finger portion 21 is normally urged in a clockwise direction so that the portion 22 will normally stand against the stop pin 25 in which position the stop member is in the path of the workpiece, this being effected by means of a plunger 28 slidably mounted at 29 in a portion of the header frame and urged toward the finger 21 by a compression spring 30 acting against the frame at its rear end and against a washer 31 mounted on the plunger at its forward end. The end of the plunger 28 may be lodged in a recess 32 of the finger portion 21 in order to retain these parts in engagement during the movement of the finger. The washer 31 may be held in place by adjustable nuts 33 so that the tension of the spring 30 may be adjusted.

The cutter bar is shown at 35 and may be advanced across the face of the die 14 by appropriate mechanism not shown. To the bar is secured the cut-off knife or shearing member 36, and these members may be provided with slots 37 and 38 milled therein to clear the stop finger 26 when the cutter bar is advanced in case that the length of the cut-off piece or blank is shorter than the thickness of these members. As shown, the cutter knife is provided with a half round groove 39 in its forward end and a finger 40 hinged to the knife at 40ª has its forward portion projecting forwardly of the knife to releasably hold a severed blank in this half round groove while the blank is fed to the heading die 15. The finger 40 is held in operative position by a spring 42 surrounding the screw 43 which is threaded in to the knife 36.

Figure 2:
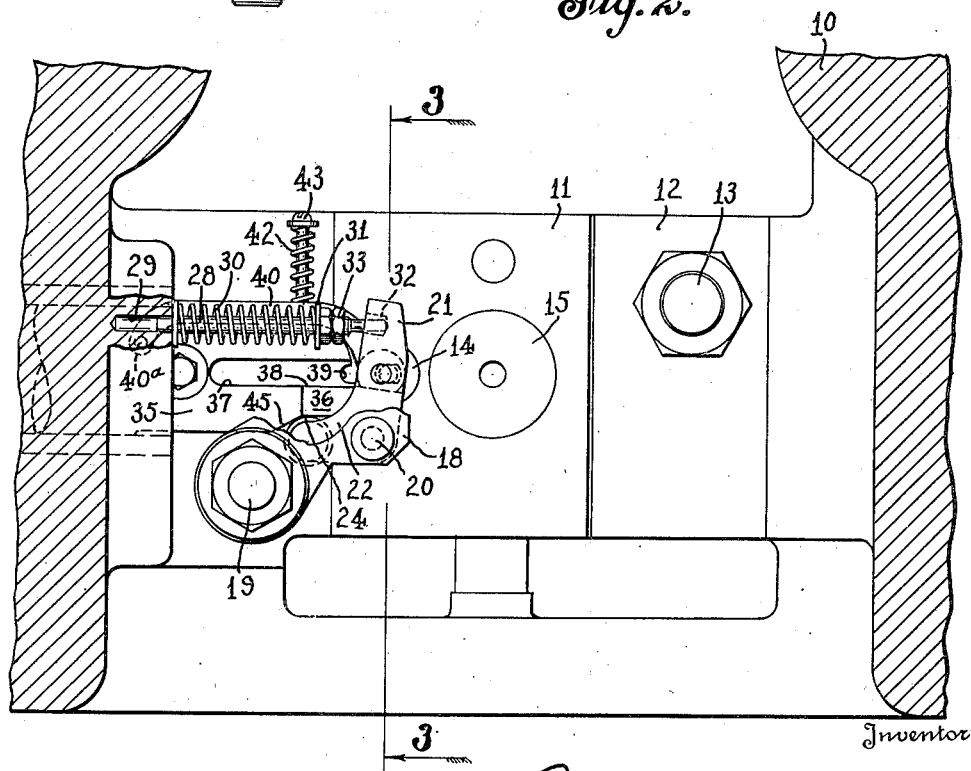
Fig. 2 is a front elevational view of the parts shown in Fig. 1, portions of the frame being shown in section.

The lower front portion of the cutter bar 35 is provided with a beveled cam surface 45 shown more especially in Fig. 2, which beveled cam surface, as the cutter bar advances, is adapted to engage the roller 24 on the finger part 22 and cause the finger to swing in a counterclockwise direction about its pivot 20, thus moving the stop member 26 to the left from the position shown in Fig. 1 out of engagement with the workpiece 16. It will be understood that the construction of the parts is such that this action takes place just prior to the beginning of the shearing operation so that during this operation the end of the workpiece will not be engaged by the stop.

As a consequence, the workpiece will be cut off squarely with a smooth end at right angles to its axis, a result which is not obtained when the stop remains in contact with the end of the workpiece during the shearing operation.

In Figs. 1 to 3 of the drawings, the parts are shown in what may be termed their normal position or the position assumed at the beginning of an operation of the machine. It will be noted that the workpiece 16, as shown in Fig. 1, projects from the face of the cut-off die 14 against the end of the stop 26. The cutter bar 35 now advances toward the work, effecting the shearing off of the projecting end of the workpiece and by the cooperation of the finger 40 carries the workpiece over to the heading die 15. As the cutter bar advances and just prior to the engagement of the cutter with the workpiece, the cam surface 45 engages the roller 24 and causes the finger portion 21 to be moved in a counterclockwise direction from the position shown in Fig. 2 to that shown in Fig. 4, in which latter position the stop member 26 has been moved out of engagement with the end of the workpiece.

When the cutter bar again moves rearwardly, the cam surface 45 is disengaged from the roller 24 which allows the spring 30 to urge the finger 21 in a clockwise direction, bringing the stop member 26 in position to again engage the workpiece when it is advanced and bringing the portion 22 of the stop finger up against the stop pin 25 mounted in the arm 18. The parts are now in position for a further shearing operation.

While I have shown and described a preferred embodiment of my invention, it will be understood that it is not to be limited to all of the details shown, but is capable of modification and variation within the spirit of the invention and within the scope of the claims.

What I claim is:

1. A solid die heading machine comprising a frame, a die block on the frame having a solid cut-off die and a heading die, a tool holder, a cut-off tool carried thereby, means to advance said tool holder and tool across the cut-off die to shear a workpiece from a length of stock, means on said tool to grip the workpiece and transfer it to the heading die, a stop member movably mounted on the frame, means urging said member to a position opposite the opening of the cut-off die to engage the end of the workpiece when the latter projects therefrom, and means on said tool holder to move said stop member out of engagement with the work as the tool is advanced and in a direction opposite that of the advance of the tool.

2. A solid die heading machine comprising a frame, a die block on the frame having a solid cut-off die and a heading die, a tool holder, a cut-off tool carried thereby, means to advance said tool holder and tool across the cut-off die to shear a workpiece from a length of stock, means on said tool to grip the workpiece and transfer it to the heading die, a stop member normally positioned opposite the opening of the cut-off die, a support for the stop member pivoted on the frame below the die block, and cam means on the tool holder to engage a part of said support as the tool is advanced and move the stop member away from the die opening in a direction opposite that of the advance of the tool.

3. A solid die heading machine comprising a frame, a die block on the frame having a solid cut-off die and a heading die, a tool holder, a cut-off tool carried thereby, means to advance said tool holder and tool across the cut-off die to shear a workpiece from a length of stock, means on said tool to grip the workpiece and transfer it to the heading die, a stop member normally positioned opposite the opening of the cut-off die, a support for the stop member pivoted on the frame below the die block, and cam means on the tool holder to engage a part of said support as the tool is advanced and move the stop member away from the die opening in a direction opposite that of the advance of the tool, said support comprising a finger having an end portion projecting toward the tool holder for engagement by said cam for movement in a downward direction.

4. In a header or like machine, a frame, a cut-off die supported thereby through which a length of work may be advanced, a heading die carried by the frame, a cutter bar, means mounting said bar for advancing movement over the cut-off die to sever a blank from the work and carry the blank to the heading die, a finger pivotally mounted on the frame, a stop member carried by said finger and adapted in one position of the finger to contact the end of the work when it is projected from the die, said finger having an end portion projecting toward the cutter bar, and a cam member on the cutter bar engaging said portion to move said finger to position to disengage the stop from the work.

5. In a header or like machine, a frame, a cut-off die supported thereby through which a length of work may be advanced, a heading die carried by the frame, a cutter bar, means mounting said bar for advancing movement over the cut-off die to sever a blank from the work and carry the blank to the heading die, a finger pivotally mounted on the frame, a stop member carried by said finger and adapted in one position of the finger to contact the end of the work when it is projected from the die, said finger having an end portion projecting toward the cutter bar, a cam member on the cutter bar engaging said portion to move said finger to position to disengage the stop from the work, and an abutment against which a part of said finger engages to limit movement thereof in one direction.

6. In a header or like machine, a frame, a cut-off die supported thereby through which a length of work may be advanced, a heading die carried by the frame, a cutter bar, means mounting said bar for advancing movement over the cut-off die to sever a blank from the work and carry the blank to the heading die, a finger pivotally mounted on the frame, a stop member carried by said finger and adapted in one position of the finger to contact the end of the work when it is projected from the die, said finger having an end portion projecting toward the cutter bar, a cam member on the cutter bar engaging said portion to move said finger to position to disengage the stop from the work, and spring means to move said finger in a direction opposite to that of its movement by the cutter bar.

7. In a solid die header, a frame, a cut-off die and a heading die carried thereby, a cutter bar mounted for movement toward and from the die opening to sever a length from a workpiece extending through the opening and carry it to the heading die, an arm mounted on the frame, a lever pivotally mounted on said arm, a stop member carried by the lever arm and adapted in one position thereof to be disposed opposite the die opening to engage the workpiece projecting therefrom, said cutter bar having a cam thereon adapted when the cutter bar is advanced to engage the lever and move the stop member from engaging position, a spring bearing against said lever to oppose its movement by said cam, and an abutment carried by said arm to engage said lever to limit its movement by said spring.

RICHARD LESTER WILCOX.

REFERENCES CITED

The following references are of record in the file of this patent:

UNITED STATES PATENTS

| Number | Name | Date |
| --- | --- | --- |
| 733,898 | Beker | July 14, 1903 |
| 927,514 | Eden | July 13, 1909 |
| 1,139,752 | Brown | May 18, 1915 |
| 1,146,611 | Carter | July 13, 1915 |
| 1,263,309 | Clouse | Apr. 16, 1918 |
| 1,271,540 | Cone | July 9, 1918 |
| 1,299,115 | Brennan | Apr. 1, 1919 |
| 1,573,487 | Gorman | Feb. 16, 1926 |
| 1,772,148 | Hornberger | Aug. 5, 1930 |
| 2,236,221 | Schwayder | Mar. 25, 1941 |
| 2,318,825 | Wilcox | May 11, 1943 |
| 2,362,970 | Bolland | Nov. 21, 1944 |

FOREIGN PATENTS

| Number | Country | Date |
| --- | --- | --- |
| 419,111 | Germany | Sept. 19, 1925 |